United States Patent [19]

Czaplicki et al.

[11] Patent Number: 5,648,401
[45] Date of Patent: Jul. 15, 1997

[54] FOAMED ARTICLES AND METHODS FOR MAKING SAME

[75] Inventors: Michael Czaplicki, Rochester; Thomas Guenther, Romeo, both of Mich.

[73] Assignee: L & L Products, Inc., Romeo, Mich.

[21] Appl. No.: 731,102

[22] Filed: Oct. 9, 1996

[51] Int. Cl.⁶ .................................................. C08J 9/08
[52] U.S. Cl. .................................. 521/85; 521/92; 521/97; 521/106; 521/123; 521/130; 521/178
[58] Field of Search .......................... 521/92, 97, 85, 521/106, 123, 130, 178

[56] References Cited

U.S. PATENT DOCUMENTS

| | | | |
|---|---|---|---|
| 2,739,134 | 3/1956 | Parry et al. | 521/178 |
| 2,831,820 | 4/1958 | Aase et al. | 521/178 |
| 3,282,863 | 11/1966 | Carey et al. | 521/178 |
| 4,016,112 | 4/1977 | Kajiura et al. | 521/85 |
| 4,119,583 | 10/1978 | Filip et al. | 521/103 |
| 4,623,478 | 11/1986 | Pastorino | 252/350 |

*Primary Examiner*—Morton Foelak
*Attorney, Agent, or Firm*—Dykema Gossett PLLC

[57] ABSTRACT

A composition which cures and foams at room temperature contains a acid-catalyzed, polymerizable resin, an acid and a filler which liberates gas in an endothermic reaction with the acid. The acid serves the dual purpose of catalyzing the polymerization reaction and generating the foaming gas.

11 Claims, No Drawings

FOAMED ARTICLES AND METHODS FOR MAKING SAME

TECHNICAL FIELD

The present invention relates generally to foamed synthetic polymers and more specifically to foamed resins which are cured at room temperature with precise control of expansion and cure rate characteristics.

BACKGROUND OF THE INVENTION

As known by those skilled in the art, a number of factors determine the suitability of a process for forming a foamed product of the type in which a blowing agent forms cells in a synthetic resin as the resin is cured. Most significantly, the interaction of the rate of cure and the rate at which the blowing gas is generated must be such that the correct foam volume is attained. If the resin cures too rapidly there is inadequate time for the gas to form the proper size and number of gas voids in the finished product. Over expansion of the forming foam product must also be avoided. Rapid expansion due to a slow cure rate may cause the expanding foam to simply collapse as a result of inadequate wall strength surrounding the individual gas cells.

A number of prior art techniques are available to control the rate of foam expansion and the cure rate. For example, a wide range of reactivities are available in commercial resins and curing agents. In addition, resins are available in a range of viscosities which is another parameter which can be used to control foam expansion rate. That is, it is known that a low viscosity resin can generally be expanded to a greater volume with a given volume of gas than a higher viscosity material; however, the resin must have sufficient viscosity to contain the gas at the pressures at which it is generated in order for the foam to be properly formed.

Particularly in automotive applications, foamed products must have good environmental resistance and, most significantly, in many applications they must protect metal from corrosion. In the past many foamed parts were made using polyurethane which provides a number of desirable attributes. It is known, however, that alternatives to urethane-based foams are frequently more environmentally desirable, in part due to unreacted functional groups in the finished products and difficulty in handling isocyanate functional chemicals in manufacturing processes.

In U.S. Pat. No. 4,623,478 entitled, Composition and Method for Making Foamed Polyester Resin, foams from unsaturated polyester resin are described which employ carbonate and bicarbonate salts. More specifically, blowing agents are used which include a salt selected from sodium and potassium carbonates and bicarbonates and water intermixed with a free-flow agent to absorb the water and render the composition a free flowing powder. It is stated that these compositions are useful in methods of creating a foam structure in polyester resin products by providing a source of gas for expansion of the resin. It is further stated therein that over the years unsaturated polyesters have been foamed by generating $CO_2$ gas through the acid decomposition of carbonate and bicarbonate salts by mixing the carbonate salt directly into the unsaturated resin mass with an acid. A system of curing agents for achieving cross-linking of the polyester resin is described.

In U.S. Pat. No. 4,119,583 entitled, Foamed Articles and Methods for Making Same, a rigid polyester foam is described which it is stated can be made without the application of heat or the use of emulsions of resin and water. It is stated that cells are blown in the resin by the reaction of inorganic acids with carbonates. Carbon dioxide is thereby liberated which forms gas voids in the resin as the resin is cured. A system of curing agents for achieving cross-linking of the polyester resin is described.

In U.S. Pat. No. 4,016,112 entitled, Process for the Production of Foamed Resin Structure, a method of producing a foamed article is described which is characterized by the synchronization of the generation of carbon dioxide by a reaction of acid esters of phosphoric acid and/or acid esters of phosphorous acid with metal carbonates and/or metal bicarbonates with respect to the polymerization with curing of a curable resin composition. The use of 1,2-polybutadiene polymers is described therein which, it is stated, can be modified and lists epoxide-modified materials, maleic-acid-modified materials and urethane-modified materials as examples thereof.

It is an object of the present invention to provide a method of forming a foamed synthetic resin which does not rely on polyurethane as the base resin.

It is a further object of the invention to provide a method of forming a foamed product which can be cured at room temperature without the addition of external heat.

It is a further object of the present invention to provide a method of forming a foamed product which uses epoxy as the base resin.

It is still a further object of the present invention to provide method of forming a foamed product which is a liquid-based system that can be utilized with equipment designed for liquid material dispensing.

It is still a further object of the present invention to provide a foamed product made in accordance with the method of the present invention.

SUMMARY OF THE INVENTION

In one aspect the present invention provides a three part system for producing a foamed product. The first component of the system is a resin which can be polymerized by an acid. The second component is an acid that is capable of initiating polymerization of the resin. The third component is a filler that reacts with the acid to generate blowing gas. No additional curing agent or blowing agent is required, i.e. they are preferably excluded; the acid initiates the curing process and gas generation.

In one aspect the present invention provides a method of forming a foamed product which comprises the steps of combining an epoxy resin, phosphoric acid and a metal carbonate or metal bicarbonate. The epoxy resin is cross-linked through a polymerization reaction catalyzed by the phosphoric acid. Simultaneously, gas is generated by the reaction of the acid with the metal carbonate or bicarbonate. In one aspect the mixture of materials is a liquid. In another aspect the mixture is a paste.

In another aspect of the invention a foamed product is provided which is made by combining an epoxy resin, a metal carbonate or metal bicarbonate and phosphoric acid and allowing the phosphoric acid to cross-link the resin and react with the metal carbonate or metal bicarbonate to generate cell-forming gas.

DETAILED DESCRIPTION OF THE PREFERRED EMBODIMENTS OF THE INVENTION

As used herein, all concentrations shall be expressed as percentages by weight unless otherwise specified. As used herein, the term "epoxy resin" shall be defined as a thermosetting resin based on the reactivity of the epoxide group. As used herein "polymerization" shall be defined as the polymerization of monomers or prepolymers. As used herein "phosphoric acid" shall include not only phosphoric acid but also esters of phosphoric acid and other derivatives which can produce the acid catalyzed polymerization as described herein.

The method and composition of the present invention has three main components: (1) a resin, preferably a liquid resin which has an average reactive functionality of at least two; (2) an acid that is capable of initiating polymerization of the resin; and (3) a filler that reacts with the acid to evolve foaming gas. No additional curing agent or blowing agent is required; the acid initiates the curing process and gas generation.

The preferred acid is relatively strong, which is a needed to obtain polymerization. As will be described more fully below, by using the preferred fillers, excessive exotherm which would otherwise be produced by the action of the strong acid (and which could produce charring) is eliminated. More specifically, heat build-up is reduced through the reaction of the acid with the filler in at least two proposed manners. First, the acid which reacts with the filler is unavailable in the curing reaction which effectively results in a dilution of the acid concentration relative to the polymerization reaction. Second the gas which is generated in the blowing reaction absorbs heat from the exothermic curing reaction such that heat is dissipated more efficiently by the polymerizing resin.

In a preferred embodiment, the resin of the present invention is an epoxy resins, most preferably Cardolite NC-514 and/or DER 331. The preferred epoxy resin has a number average molecular weight of from about 350 to about 600 and, on average, each molecule of epoxy has from about 1.8 to about 2.5 epoxide functional groups. The preferred epoxy resin has a viscosity of from about 20,000 to 100,000 cps (Brookfield viscosity) at 70° F. and a specific gravity of from about 1.0 to about 1.4. A particularly preferred epoxy resin is sold under the name "Cardolite NC-514" by the Cardolite Company of Newark, N.J. As stated, the preferred form of the resin is a liquid. Other epoxy resins which may be suitable in the present invention in a particular application are DER 331, DER 337 and DER 324. A resin forms from about 35 to about 95% by weight and more preferably from about 50 to about 75% by weight of the composition of the present invention.

The preferred acid in the present invention is one which is capable of reacting with the preferred resin to promote a polymerization reaction that results in a controlled curing of the resin and which simultaneously reacts with the filler component to liberate a blowing gas. Phosphoric acid (orthophosphoric acid; H3PO4) is most preferred. Most preferably the acid component of the composition of the present invention is a liquid. The strength of the acid in Molarity is preferably from about 10 to about 14.7M and more preferably from about 12 to about 14.7M. It is most desirable in the present invention to minimize the quantity of water present in the composition since water slows down the reaction rate and may produce a product with lower cohesive strength. Accordingly, it is preferred that concentrated acids be used in the present invention. The quantity of phosphoric acid in the composition of the present invention is preferably from about 1 to about 25% by weight and more preferably from about 5 to about 15% by weight of the composition of the present invention. Since the acid component may not become part of the polymer network once cured, it is desirable to minimize the amount of acid used to the extent possible. In a preferred embodiment of the present invention the acid component of the present invention is mixed with an inert material such as carbon black powder or a thixotropic material such as aramid pulp to a concentration of from about 25 to about 75% by weight of the combination of acid and inert material. Another preferred inert materials for use in the present composition is ceramic microspheres having a size range of from about 25 to 500 microns. This embodiment, with the acid premixed to form a paste, may be preferable in some materials handling environments.

The filler component in the present invention is one which will generate a gas in a volume sufficient to serve as the blowing medium for the foam. Suitable fillers for use in the present invention are metal carbonates such as calcium carbonate, nickel and barium; metal bicarbonates such as sodium bicarbonate, and potassium bicarbonate. Most preferred for use are the metal carbonates and metal bicarbonates and particularly preferred is calcium carbonate and anhydrous sodium bicarbonate. The filler in the present invention is a particulate material and the size of the particles should range from about 1 to about 50 microns with the average size of the particles being from about 4 to about 20 microns. It has been found that expansion and cure can be controlled through filler particle size in the present invention. Total filler surface area is a function of filler quantity and filler particle size; total filler surface area determines the amount of filler available to react with the acid component. In the present invention is preferred that the size of the filler particle be used rather than the quantity of filler to provide the total desired surface area. Filler comprises from about 1 to about 50% by weight and more preferably from about 15 to about 35% by weight of the composition of the present invention. A preferred filler is sold by Global Stone Corp. under the name GPR325 and comprises particles of calcium carbonate approximately 14 microns in diameter.

A number of other additives can be utilized in the present invention such as carbon black, solid rubber particles, hollow microspheres, and inert polymer particles, if desired in a particular application.

The following table I sets forth the preferred and most preferred ranges in percent by weight for the components of the composition of the present invention in one preferred formulation:

TABLE I

|  | Preferred | Most Preferred |
| --- | --- | --- |
| epoxy resin | 35–95 | 50–75 |
| phosphoric acid | 1–15 | 3–10 |
| calcium carbonate | 1–50 | 15–35 |
| ADDITIVES: |  |  |
| carbon black | 0–20 | 0.1–10 |
| ceramic microspheres | 0–20 | 0.1–10 |
| rubber particles | 0–15 | 0.1–5 |

In the method of the present invention, the resin, acid and filler are combined, preferably in liquid form, for example the materials can be admixed either statically or dynamically with the mixture then being placed in the mold cavity, the mold cavity being an automotive body cavity or any cavity that one would like filled with foam. Alternatively, atomized streams of the separate materials can be impinged into a mold cavity. The filler and the resin are preferably premixed and the acid added just prior to application. In those applications where the acid is also premixed with inert filler, the volumetric mix in this preferred premix step is preferably from about 1-1 to 20-1 (resin/filler-to-acid/inert material). Once mixed, the composition cures at room temperature (that is, without adding external heat) and the reaction of the acid with the filler evolves gas which foams the resin.

EXAMPLES

The following examples are intended to more fully illustrate the present invention and are not intended to limit the scope of the invention.

Example I

|  | percent by weight |
| --- | --- |
| CARDOLITE NC-514 epoxy resin | 57% |
| GPR 325 | 34% |
| 85% phosphoric acid | 9% |

The formulation of Example I had an increase in volume of approximately 600% when foamed and cures in approximately two minutes. The resultant foam had a smooth skin, fine cell structure and was rigid.

Example II

|  | percent by weight |
| --- | --- |
| Part I |  |
| CARDOLITE NC-514 epoxy resin | 42.6% |
| GPR 325 | 19.1% |
| Part II |  |
| 85% phosphoric acid | 19.1% |
| Raven 410 carbon black | 8.5% |
| Zeospheres 400 | 6.4% |
| Krynac powdered nitrile rubber | 4.3% |

Example III

|  | percent by weight |
| --- | --- |
| CARDOLITE NC-514 | 34% |
| DER-331 | 34% |
| GPR 270 | 20% |
| 85% phosphoric acid | 12% |

The formulation of Example III had approximately 400% expansion (5×non-foamed volume) when foamed, a gel time of approximately one minute, and full cure in about 20 minutes.

Thus it is apparent that there has been provided in accordance with the invention a method and apparatus that fully satisfy the objects, aims and advantages set forth above. While the invention has been described in connection with specific embodiments thereof it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. A method for producing a foamed article, comprising the steps of:

providing an epoxy resin;

providing a filler selected from the group consisting of metal carbonates and metal bicarbonates;

providing phosphoric acid; and combining said epoxy resin, said filler and said phosphoric acid to form a reactive mixture and allowing said phosphoric acid to catalyze polymerization of said epoxy resin and react with said filler to generate a blowing gas to form voids in said polymerized epoxy resin.

2. The method for producing a foamed article recited in claim 1, wherein said epoxy resin comprises from about 35% to about 95% by weight of said reactive mixture.

3. The method for producing a foamed article recited in claim 1, wherein said filler comprises from about 1 to about 50% by weight of said reactive mixture.

4. The method for producing a foamed article recited in claim 1, wherein said phosphoric acid comprises from about 1 to about 15% by weight of said reactive mixture.

5. The method for producing a foamed article recited in claim 1, wherein said filler is selected form the group consisting of metal carbonates and metal bicarbonates.

6. The method for producing a foamed article recited in claim 1, wherein said epoxy resin and filler are combined prior to adding said phosphoric acid.

7. The method for producing a foamed article recited in claim 6, further including the step of combining said phosphoric acid with an inert filler prior to combining said phosphoric acid with said epoxy resin and filler.

8. The method for producing a foamed article recited in claim 7, wherein the volumetric ratio of the resin with filler to phosphoric acid with inert filler is from about 1:1 to 20:1.

9. The method for producing a foamed article recited in claim 1, wherein the molarity of said phosphoric acid is from about 10 to about 14.7.

10. The method for producing a foamed article recited in claim 1, wherein said reactive mixture further includes an additive selected form the group consisting of carbon black, ceramic microspheres, polymer particles, rubber particles, ceramic particles, inert mineral particles and combinations thereof.

11. A method for producing a foamed article, comprising the steps of:

providing an epoxy resin;

providing a filler selected from the group consisting of metal carbonates and metal bicarbonates;

providing phosphoric acid;

combining said epoxy resin, said filler and said phosphoric acid to form a reactive mixture and allowing said phosphoric acid to catalyze polymerization of said epoxy resin and react with said filler to generate a blowing gas to form voids in said polymerized epoxy resin; and excluding any additional curative agent and blowing agent.

* * * * *

UNITED STATES PATENT AND TRADEMARK OFFICE
CERTIFICATE OF CORRECTION

PATENT NO. : 5,648,401
DATED : July 15, 1997
INVENTOR(S) : Michael Czaplicki and Thomas Guenther It is certified that error appears in the above-indentified patent and that said Letters Patent is hereby corrected as shown below:

```
Column 6, line 26, "form" should be -- from --.
Column 6, line 44, "form" should be -- from --.
```

Signed and Sealed this

Twenty-first Day of October 1997

Attest:

BRUCE LEHMAN

*Attesting Officer*     *Commissioner of Patents and Trademarks*